United States Patent [19]
Sheeter

[11] Patent Number: 5,322,129
[45] Date of Patent: Jun. 21, 1994

[54] TOOL ARRAY

[76] Inventor: Eric Sheeter, C.22 Beaver Point Road, R.R.1, Fulford Harbour, B.C., Canada, V05 1C0

[21] Appl. No.: 934,439

[22] PCT Filed: Mar. 6, 1991

[86] PCT No.: PCT/GB91/00353
§ 371 Date: Oct. 13, 1992
§ 102(e) Date: Oct. 13, 1992

[87] PCT Pub. No.: WO91/13537
PCT Pub. Date: Sep. 19, 1991

[30] Foreign Application Priority Data

Mar. 8, 1990 [GB] United Kingdom ............... 9005252

[51] Int. Cl.$^5$ ............. A01B 41/06; G06F 15/50
[52] U.S. Cl. ................. 172/2; 364/424.07; 172/649
[58] Field of Search ........... 172/2, 4, 4.5, 293–296, 172/645, 649; 111/200; 901/41, 47; 364/424.07, 474.11

[56] References Cited

U.S. PATENT DOCUMENTS

| | | |
|---|---|---|
| 3,983,373 | 9/1976 | Russell . |
| 4,342,270 | 8/1982 | Lofgren et al. . |
| 4,651,074 | 3/1987 | Wise . |
| 4,835,691 | 5/1989 | Rotem et al. ............... 364/424.07 X |
| 4,843,561 | 6/1989 | Larson . |

FOREIGN PATENT DOCUMENTS 3513507  4/1985  Fed. Rep. of Germany .

Primary Examiner—Clifford D. Crowder
Assistant Examiner—Paul C. Lewis
Attorney, Agent, or Firm—Ostrolenk, Faber, Gerb & Soffen

[57] ABSTRACT

An array (1) of tools for use in planting in combination produce a variety of patterns of operation to provide a required density and pattern of plants. Each tool (6) is provided with an independent sensory/motor system (9) which moves the tool (6) independently with respect to the array (1). A controller (14) in response to a control signal positions the tool (6) automatically in a desired location. The control signal may be an environmental cue such as a region of illumination controlled by the user, or may be a signal generated by a neighboring tool.

7 Claims, 8 Drawing Sheets

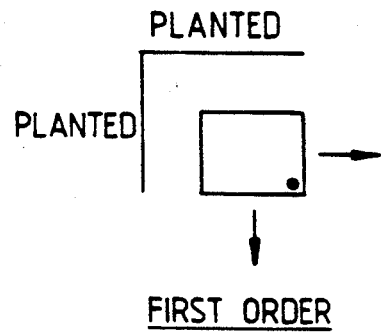
Fig.18(a).
FIRST ORDER
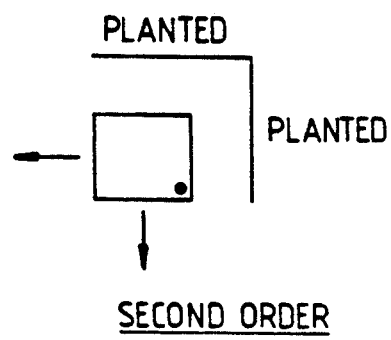
Fig.18(b).
SECOND ORDER
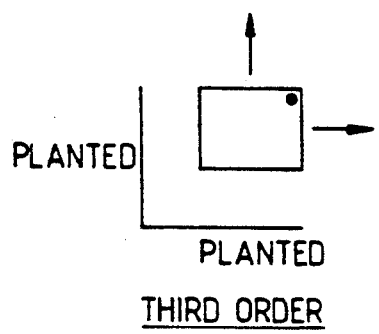
Fig.18(c).
THIRD ORDER
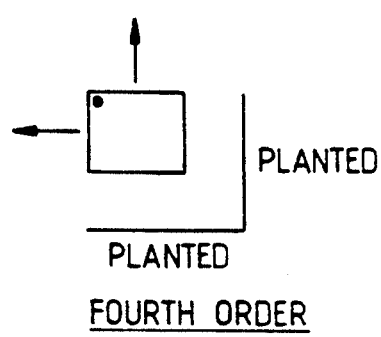
Fig.18(d).
FOURTH ORDER
Fig.19.
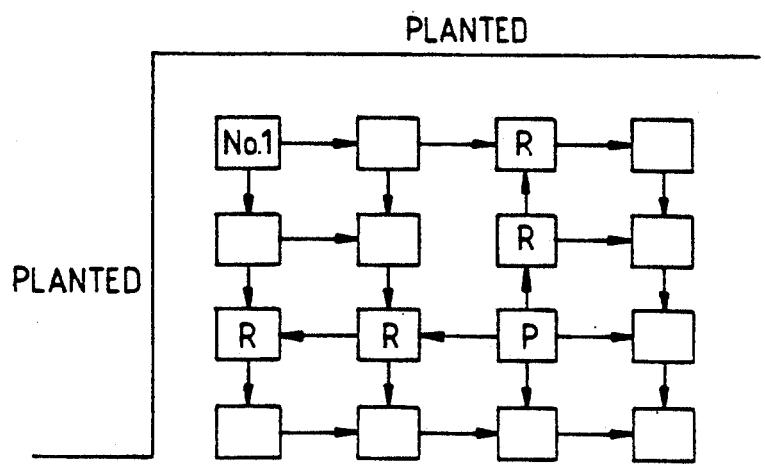
"P" IS HALTED AND PLANTING. THE ORDER OF PRECEDENCE OF THE TOOLS "R" IS REVERSED.

TOOL ARRAY

BACKGROUND OF THE INVENTION

The present invention relates to an array of tools which can be used in combination to produce automatically a variety of patterns of operation. Such an array may be used, for example, in silviculture, with each tool of the array either preparing a region of ground to receive a tree, or planting a tree in a region which has already been prepared, with the overall action of the array arranged to provide a required density and pattern of plants.

The applicant's earlier U.S. Pat. No. US-A-4790400 describes and claims a vehicle suitable for use in silviculture which can be arranged to carry an array of planting tools which may operate simultaneously. The vehicle and the tool array may be controlled by an operator in a cab mounted centrally on the vehicle. Such a vehicle can operate on very difficult ground and, with appropriate tools, can maintain high planting rates and desired work quality.

A number of problems are encountered in using an array of tools which operate simultaneously. A prime requirement, particularly in silviculture but also in other types of cultivation, is the achievement of an optimum planting density. It is of course possible to set spacing between the tools in the array so as to give the required density. In practice however it is found that if predetermined relative positions are used for the tools then a significant proportion of the tools will then be located over regions of ground which are unsuitable for planting. This problem can be overcome by manual adjustment of the position of the tools. However such manual adjustment adds significantly to the time taken for the planting process making it difficult to achieve high enough planting rates.

DISCLOSURE OF INVENTION

According to a first aspect of the present invention, in an array of tools for planting, each tool is provided with an independent sensory/motor system comprising means to move the tool independently with respect to the array and a controller for the means to move responsive to a control signal to position the tool automatically in a desired location.

The present invention provides a tool array in which the tools are independently and automatically movable. It is therefore possible to adjust the position of a tool whilst the array is in use without it being necessary to stop to make a manual adjustment. It is therefore particularly useful in conditions where the ground to be planted is obstacle strewn since one or more tools can then be quickly moved out of the way of obstacles without having to stop the planting process.

Preferably the controller includes a sensor arranged to detect a perceptual cue in the environment of the tool, and means to generate a predetermined motor response in the means to move in response to the perceptual cue.

It is found to be particularly advantageous to base the control of the movement of the tools upon fixed motor responses to perceptual cues. These perceptual cues may take the form of light or sound signals detected by an appropriate sensor. It is found that with such an arrangement the complex calculations which would be necessary with a centralised control system with motion controlled by standard robotic methods are avoided and the desired control can be achieved using algorithms which are by comparison simple and shallow.

The perceptual cue may be a signal generated by another one of the tools in the array to control the position of the one tool with respect to the other tool. Alternatively the cue may be generated by a signal source controlled by the user to mark a location on the ground to be planted. Preferably the controller is responsive to both these forms of cues.

Preferably the signal source controlled by the user is a light source arranged to generate different regions of illumination in which case the sensor includes photosensor means responsive to the different regions of illumination and the tool is arranged to move to a location on the boundary between two such regions of illumination. The different regions of illumination may be characterised by different polarisation states, or by different patterns of intensity modulation but are preferably of different colours. Alternatively a sound source may be used, in which case the different regions may be characterised by different amplitudes or frequencies.

Preferably the predetermined motor response is such that the tool moves towards the boundary between the two regions until it is on the boundary and subsequently moves along the boundary until it reaches the marked location.

It is found to be advantageous to arrange the tools to be sensitive to two different regions marked by different perceptual cues. The boundary between those two regions can then be used not only to mark the desired location but also to define a path to that location. In the case of light, different regions of illumination may be provided, for example, by red and green light sources mounted on either side of the principal axis of a pointer, the sources being arranged to provide contiguous but substantially non-overlapping regions of illumination on the ground under the array.

Preferably the controller is arranged to compare the intensity of illumination detected by the photo-sensor means with a predetermined threshold value and to stop the movement of the respective tool when the threshold value is reached.

It is possible to mark the desired location by the point at which a selected light intensity contour intersects the boundary between the different regions of illumination. It is then only necessary to compare the intensity of illumination with a set threshold value in order for the tool to recognise the location.

Preferably the photo-sensor means includes different sensors for the respective regions of illumination and the control means are arranged to compare the outputs from the respective sensors and to produce a predetermined motor response in accordance with the results of the comparison.

As an alternative to, but preferably in addition to detecting an intensity threshold the photo-sensor means and control means may be arranged to detect a bright spot marking the location.

By providing an additional marker for the desired location in the form of a bright spot, that is a region illuminated by a light source pointed directly at the chosen spot, it is found that a further significant improvement in the operation of the system is achieved. In particular, as described in further detail below, it overcomes the problems encountered with uneven terrain where the intensity threshold may be displaced from the required location.

While the first aspect of the present invention greatly facilitates the adjustment of the location of the position of planting tools it still relies heavily on the expertise of the operator in minimising departures from the ideal spacing. Ensuring the correct planting density is of great importance. The second aspect of the present invention addresses the problem of allowing variation in the positions of planting tools within the array whilst ensuring that the required spacings are maintained.

According to a second aspect of the present invention, in an array of tools for planting, each tool is provided with means to move the tool independently with respect to the array and means responsive to a signal from a neighbouring tool to determine a parameter dependent on the relative spacing of the tool and neighbouring tool.

Preferably the means responsive to a signal comprise a sensor arranged to receive the signal, comparator means arranged to determine from the received signal the parameter dependent on the spacing and to compare the said parameter with a predetermined threshold, and control means responsive to the comparator means to adjust the spacing of the tool and the neighbouring tool in accordance with the results of the comparison.

The second aspect of the present invention provides an array in which individual tools can communicate with each other to determine their relative spacing. They may either automatically adjust their spacing as necessary to provide the required planting density or, in a semi-automatic system, signal an erroneous spacing to an operator. This aspect of the invention is therefore able to combine the required flexibility in the positioning of individual tools with the necessary strict control of the overall planting density. Moreover it is found that by distributing the intelligence of the system between the different tools and by the use of perceptual guidance the optimum planting pattern can be adequately obtained in real-time more simply than would be possible using, for example, a central control processor for the entire array which calculated in a robotic fashion a position for each tool relative to chosen sets of axes and the relative positions on these axes of adjacent tools.

Preferably the control signals are light or sound signals and each tool includes both a signal source and a signal sensor.

The use of light or sound signals for operator to tool and for inter-tool communication avoids problems which would occur, for example, in a digital control system requiring the transmission of digital information over distances of some metres, and reduces the complexity of wiring for the array.

Preferably each tool is arranged to determine from the intensity of the signal received from a neighbouring tool the relative spacing of that tool.

Preferably each tool includes means for setting a parameter or parameters determining the precedence of the tool and the tools are arranged so that when a tool and a neighbouring tool are found to have a spacing falling outside predetermined limits the tool having the lower precedence moves to increase or decrease the relative spacing. Alternatively in a semi-automatic system it is the tool having the lower precedence which signals to the user that a move is needed.

Preferably each tool includes means to transmit a first signal determining the inter-tool spacing and a second signal determining the tolerance in the inter-tool spacing.

Preferably each tool includes first and second different light sources arranged to provide the respective spacing and tolerance signals. The different light sources may be differentiated by, for example, different polarisation states, or by different patterns of intensity modulation such as ON-OFF flashing at different frequencies, but preferably are differentiated by different respective colours.

Preferably each position sensor includes corresponding different light sensors and the comparator means are arranged to compare the outputs of the different sensors with respective thresholds and the control means produce a predetermined motor response in accordance with results of the comparison.

The preferred aspects of this invention use fixed motor responses determined by the intensities of two forms of illumination. It is therefore particularly advantageous to combine this aspect of the present invention with the use of two forms of illumination to mark a planting spot as described above with reference to the first aspect of the present invention.

BRIEF DESCRIPTION OF DRAWINGS

A planting tool array in accordance with the present invention will now be described in detail with reference to the figures of the accompanying drawings in which:

FIGS. 18a–18d diagrams showing ideal positions within the respective tolerance regions for the four different orders;

FIG. 19 is a diagram showing the precedence when a tool is halted and planting.

DETAILED DESCRIPTION OF PREFERRED EXAMPLE

Figure 1:
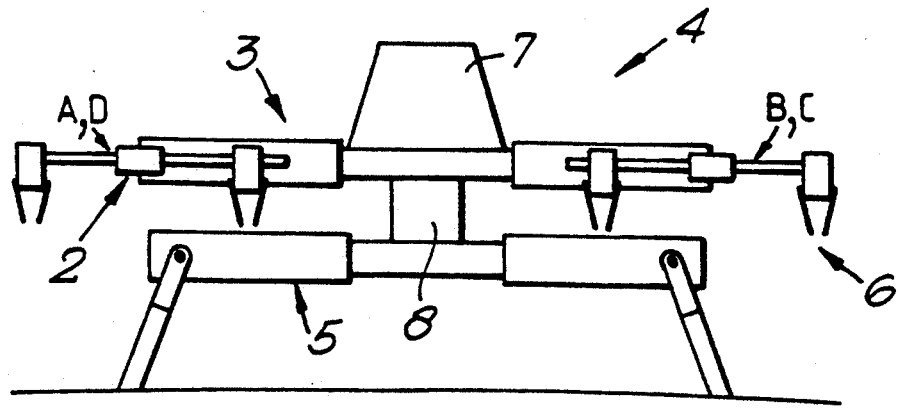
FIG. 1 is a side elevation of an array mounted on a vehicle.
Figure 4:
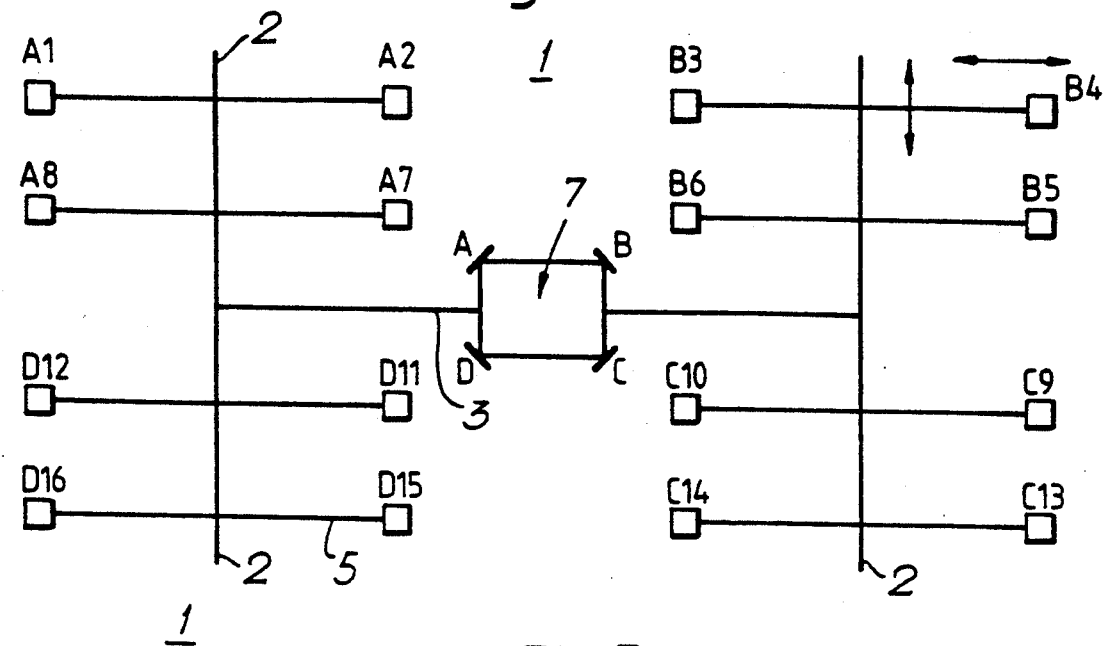
FIG. 4 is a plan of an array mounted on a vehicle.

An array 1 of planting tools comprises four sub-arrays ABCD (FIG. 4). The sub-arrays are mounted on sub-beams 2 coupled to the upper main beam 3 of a vehicle 4 (FIG. 1). The vehicle 4 comprises upper and lower main beams 3,5 joined by a pivot 8 and is arranged to traverse rocky or rough terrain using a stepping mechanism. A suitable vehicle is described and claimed in the above cited patent.

The planting tools may comprise planting heads such as those described in the applicant's earlier international application publication number WO/90/10373, ground preparing tools, or any suitable combination of these.

Figure 2:
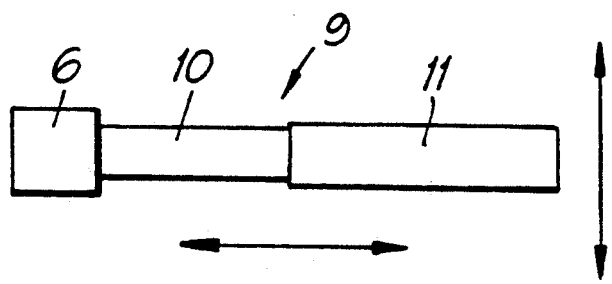
FIG. 2 is a plan of a tool and its gantry.

Each planting tool 6 is mounted on its respective sub-beam 2 by a Cartesian gantry 9 arranged to allow free translational movement in the horizontal plane. A preferred form for the gantry is shown in FIG. 2. The tool is mounted on an inner support member 10 which moves telescopically within an outer support member 11. The tool 6 moves backwards and forwards on the inner member 10 within the outer member 11 to provide motion in the longitudinal direction. The outer member 11 is slidably mounted on the sub-beam 2 and is driven backwards and forwards in that mounting to provide the required motion in the lateral direction. The motors M for the gantry are driven under the control of a control unit associated with the tool 6 as described in further detail below.

Figure 3:
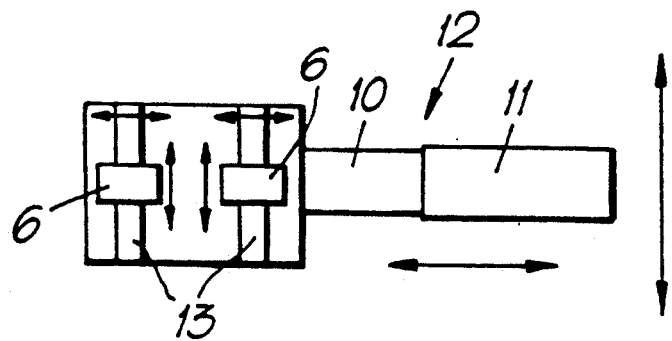
FIG. 3 is a plan of an alternative gantry.

FIG. 3 shows an alternative form for the gantry in which two tools 6 are mounted on a single main gantry 12, which each tool being provided with its own sub-gantry 13. The gantry 12 is driven by actuators controlled by a single board computer (SBC) 14 associated with each tool 6. The SBC controls the movement in response to a light signal provided by the operator from the vehicle cab, marking the spot on the ground 20 where the particular tool 6 is required to operate. This provides a method which enables a machine operator, whilst remaining in the vehicle cab 7, to choose a spot for a given tool, mark the spot in a machine recognisable way and call the tool to the spot. The mark is such that it can be left, the tool following its directions automatically to the mark at which the tool will halt. Whilst this is happening the operator can attend to the next tool.

It is assumed here that before "pointing" takes place the tools are set-up for a given spacing and tolerance prescription and have moved to a uniform "start" position. They will space themselves automatically from each other. The operator then attempts to choose a suitable planting spot, within the tolerance region surrounding the start position and preferably as close to this position as possible (in order to reduce the time needed for tool travel). Having chosen for a given tool a work spot the operator points to it. Thereafter tool operation is automatic.

Figure 6:
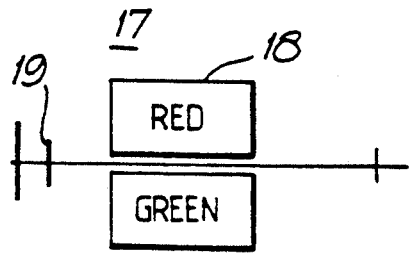
FIG. 6 is a diagram showing a pointer.
Figure 7:
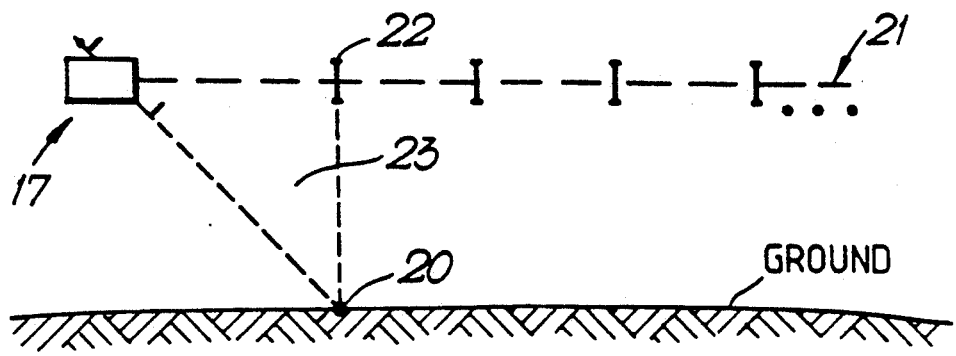
FIG. 7 is a side elevation showing the pointer in use.
Figure 8:
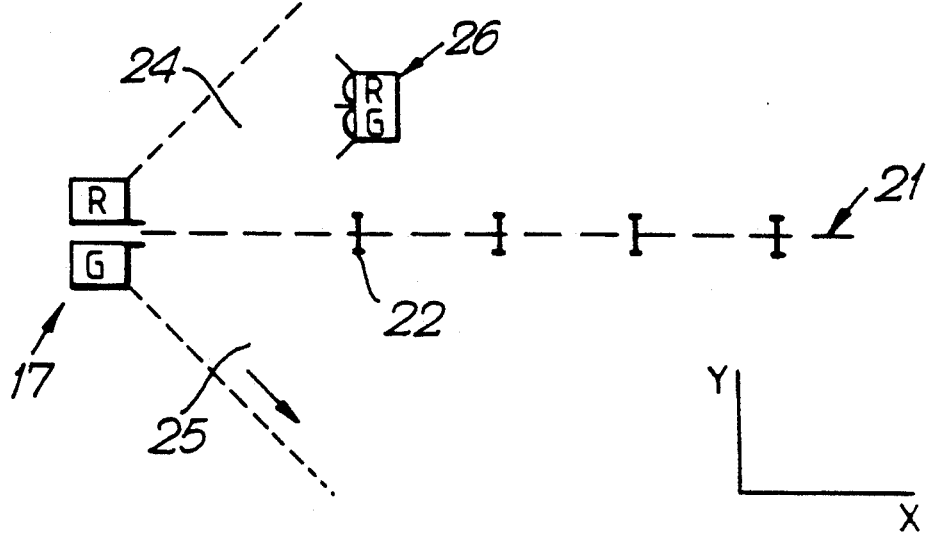
FIG. 8 is a plan showing the pointer in use.

FIG. 6 shows a plan form of a schematic pointer 17. It consists of two light sources 18 surrounding a sighting device 19 which can be thought of as a "tube". By means of the device the operator points to the spot which he has chosen. The two light sources produce different coloured light; let us say red and green colour and/or polarity can be used for choice, spacing, tool set-up etc. The spot pointed to 20 is thus on the line of colour discontinuity 21 (FIGS. 7 and 8).

The use of the pointer 17 in an idealised case will first be described. Some complications are then dealt with to produce a practical device.

In the ideal case the device is to be used on a flat, unobstructed, horizontal plane with the pointer 17 being able to be translated parallel to the "X" axis or to the "Y" axis. It is arranged that the intensity of both the light sources vary with the angle of the pointer from the horizontal so that the spot chosen is always directly beneath a "contour" of intensity 22 having a chosen value —a "threshold" value (FIGS. 7 and 8). This contour 22 and the line of colour discontinuity 21 fix the position of the spot pointed to 20. If it is then arranged that a tool 6 possesses a sensory system 26 including two sensors, one sensitive to red light 27 the other sensitive to green light 28 and that the sensory system can recog- nise a threshold (in this case that of the fixing intensity contour) then by the use of a response to the balance of light intensity received on the red and green sensors, and a response to a threshold value—move in the direction of increasing (decreasing) intensity until a given intensity value is reached—a tool can be made to move from any position in its tolerance region to the line of colour discontinuity 21 and then along this line to the threshold contour 22 when it will halt, its being directly above the chosen spot 20.

The position of the threshold contour 22 (TH) can be made to vary as a function of the angle of the pointer 17 with the horizontal. This can be achieved by such means as the dimming or brightening of the pointer light sources 18 with a change of angle of the sighting tube. The effect can be achieved by such means as a rheostat whose setting is altered by the rotation of the tube, giving rise to brightening of the light sources as the tube is rotated towards the horizontal and to dimming of the light sources as the tube is rotated towards the vertical. As the light sources are brightened TH is positioned farther from the light sources. As the light sources are dimmed TH is positioned nearer to the light sources.

Figure 9:
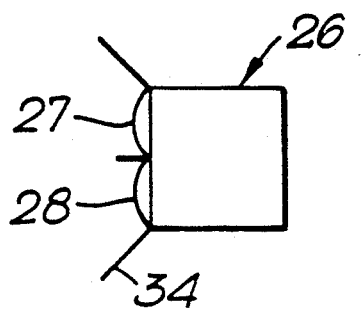
FIG. 9 is a plan of a light sensor.

To bring a tool onto the line of colour discontinuity from any position in its tolerance region, a fixed motor response to the state of balance or unbalance of the light being received via the red and green sensors is used (FIGS. 8 and 9 Table 1). In FIG. 8 it is seen that if the tool is in the red sector 24 the red sensor will be receiving input but the green sensor will be receiving no input. The tool moves "to" the sensor which is low logic of this response is shown in Table 1. The implementation of this logic is discussed in further detail below. This response will move the tool towards the line of colour discontinuity. When the green sensor crosses the line it will become illuminated. At this point both sensors are "balanced" and "Y"—motion (FIG. 8) halts. The tool will move along the line of colour discontinuity to the TH value. If deviation from the line occurs the state of balance/unbalance of the sensors will trigger a motor response which brings the tool back to the line.

If the tool is in the green sector 25 then an identical response (move to low) to that already described will move the tool towards the red sector 24 and hence towards the line of colour discontinuity.

Figure 15:
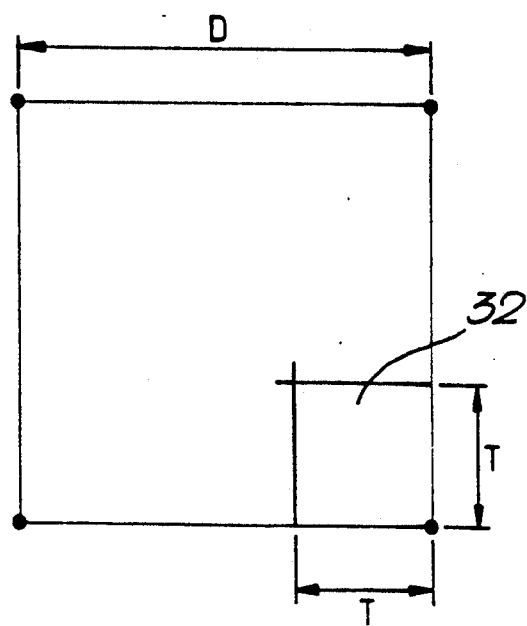
FIG. 15 shows a tolerance region for a planting pattern.

This scheme must be modified to deal with two practical difficulties. Slopes have to be dealt with and local severe unevenesses. In a practical solution a pointer is to be in a fixed position relative to a tool tolerance region 32 (FIG. 15). It will rotate around this position horizontally and vertically. These "vertical" and "horizontal" rotations are such when the vehicle is standing on a smooth horizontal plane with its transverse and longitudinal axes parallel to the plane, in this condition the vertical axis (let us say that the longitudinal axis of each tool is vertical) of a given tool positioned at the intersection of the line of colour discontinuity and the threshold contour, TH, will be above the spot which is being pointed to (FIG. 7).

Figure 10:
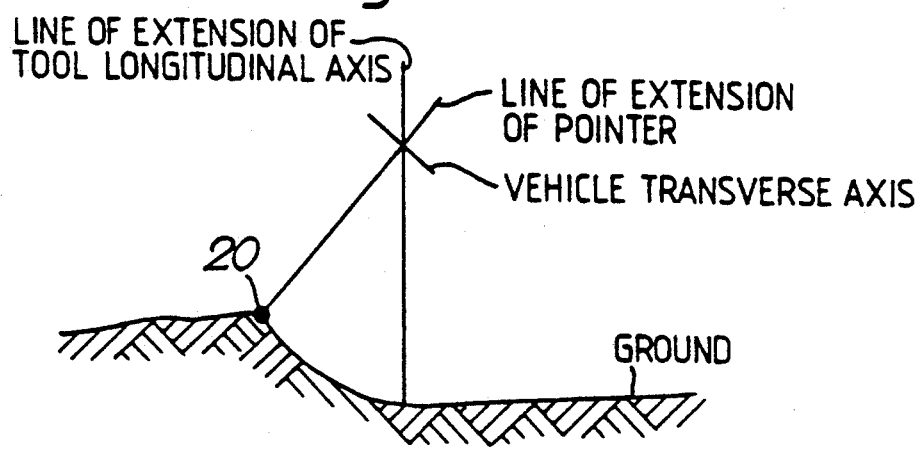
FIGS. 10 and 11 show the use of the pointer on uneven ground.
Figure 11:
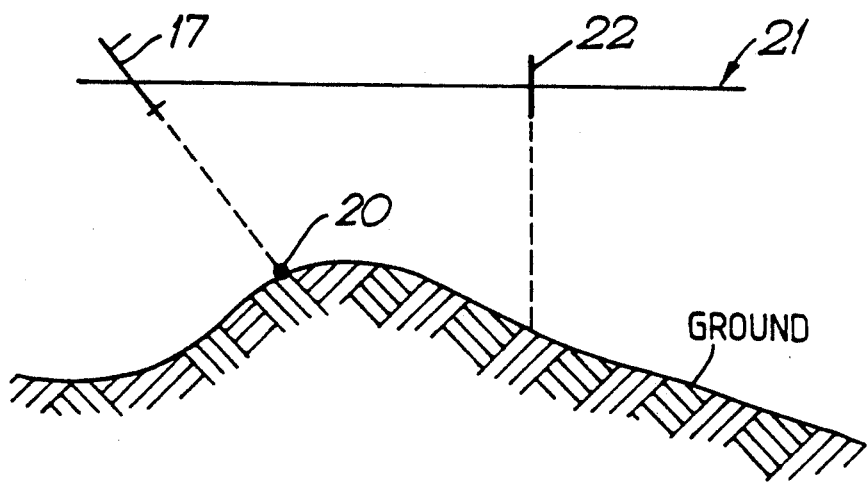

The planting tool has to be kept vertical in order to place trees vertically. Suppose for ease of discussion that the planting tool is symmetrical around its longitudinal axis and that this axis is automatically brought to the vertical. FIG. 7 shows the plane 23 defined by the line of extension of the pointing tube and the line of colour discontinuity (pointer plane 23). On uneven ground unless this plane 23 is also brought to a vertical position a tool travelling along the line of colour discontinuity 21 will not necessarily point to the chosen spot when it reaches TH 22 (FIG. 10). Furthermore, in the presence of sharp local unevenesses even if the tool and the pointer plane are vertical, when the tool reaches the threshold, TH, it is still not necessarily above and pointing to the spot 20 which has been chosen and is being pointed to (FIG. 11).

Rough levelling will be performed which is guided by, e.g., two spirit levels. Each pointer is roughly balanced. The operator releases a "lock" to move a pointer whereupon it will tend to come to a rough "level" position. To deal with any remaining mismatch between the spot pointed to by the pointer and the spot (at TH) pointed to by the longitudinal axis of a tool, a "bright" spot is introduced and a scan which the tool is to perform if it has reached TH but has not sensed the bright spot. The use of the two colour sector pointer, the bright spot, TH and the scan has been found to simplify the remaining problems in semi-automatic and automatic choice.

With the use of a bright spot and a scan the threshold could be disposed with and also the colour sector response. However the use of TH and the colour sectors provides the basis of a solution to other problems. In semi-automatic choice the threshold TH is needed to "Tell" a tool which direction to travel in; the direction of travel needed will vary with array position and the particular case; tools are to be interchangeable. The colour sector response will carry a tool rapidly either to a position above the spot pointed to or to the vicinity of the spot pointed to.

Figure 12:
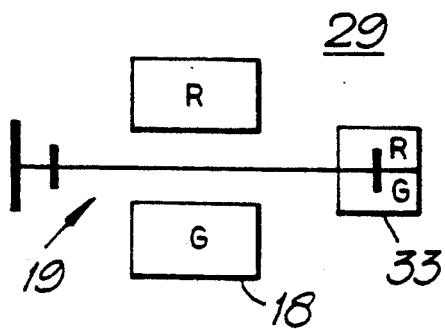
FIG. 12 shows an alternative arrangement for the pointer.
Figure 13:
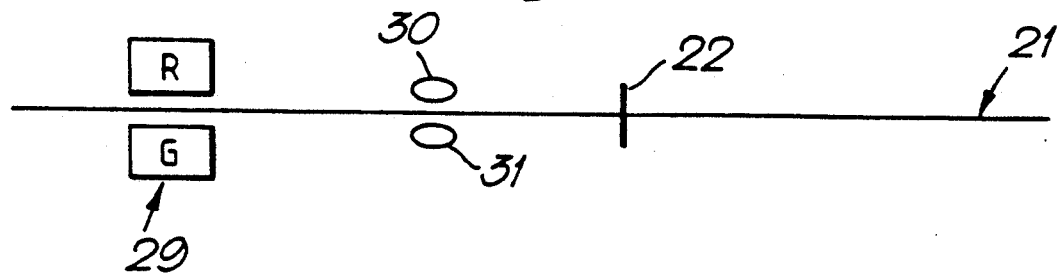
FIG. 13 shows the pointer of FIG. 12 in use.

FIG. 12 shows a modified pointer 29. It consists as before of a sighting tube 19 and two coloured lights 18 which define the line of colour discontinuity. On either side of the tube and rotating with it are two further lights 33 which produce a bright spot 30,31. The lights can be coloured (e.g. red and green) and the same response as that used to bring the tool to the discontinuity line can be used to centre a tool above a spot pointed to.

Figure 14:
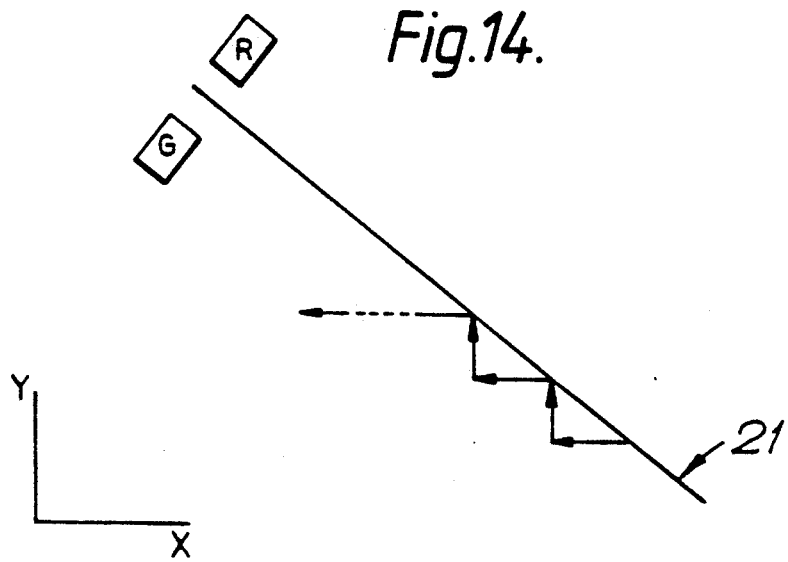
FIG. 14 shows the path of the tool.

With a two coloured bright spot 30,31 being used and with rough levelling bringing the bright spot close to being vertically below the line of colour discontinuity 21, a tool which has reached TH 22 will either sense the bright spot (its red sector or its green sector or both sectors) and come under its control or it will not have sensed the bright spot (i.e. local unevenness). In this case it will perform a scan around TH until the bright spot sectors are sensed. With rough levelling having been performed, in the case being considered the tool need only advance along the discontinuity line to come under the influence of the bright spot sectors (FIG. 14). If it happens that the bright spot sectors are sensed before TH is reached then the "bright spot" response overrides the move to TH response.

The pointer for a given tool, in a practical solution, will be mounted in the cab 7 or on the cab structure. The pointer plane 23 of a given pointer 17,29 will not when pointing to a position be in such a position that the continuity line is parallel with an axis of horizontal movement of the tool which is being controlled. Even so the perceptual/motor response which has been described will still be usable. A tool will now move along the line of discontinuity in a sequence of steps (FIG. 14). To achieve this an interaction is needed between "X" and "Y" motion. This interaction can be software controlled. To as much as possible equalise the input to both sensors ("red" and "green") they are turned towards the vehicle centre. FIG. 9 shows the arrangement of sensors.

The sensors need to be hooded 34 (FIG. 9) so that, for example, a green sensor in the red sector is largely unlit, but once the discontinuity line is crossed (it will usually be crossed at an angle so that neither sensor faces the light source to which it is sensitive) the previously unlit sensor receives sufficient input for a decision to be made via the SBC as to whether both sensors are lit and as to whether the difference between the input received by one is within a given distance from that received by the other.

Depending on the distance apart of the green and red sensors and the angle at which they straddle the line of discontinuity, one sensor (which depends on the position in the array of tools) will reach the threshold value before the other. One sensor reaching the threshold value can either halt the tool (in fact if this occurs the tool will have come under the influence of the bright spot) or send it into a scanning motion (i.e. threshold reached bright spot not sensed).

Brief sketches of two alternative embodiments are given here.

FIG. 11 shows a case where the spot pointed to does not coincide with the spot fixed by the threshold contour and the line of colour discontinuity. Provided that the pointer plane 23 (the plane shown in FIG. 7) is vertical the spot will be reached by moving on the discontinuity line. It would be possible to use a sonar IC (integrated circuit) and to measure the distance to the spot. The discrepancy with the ideal condition could be calculated from this measurement and a signal produced (e.g. bringing TH closer to the light source) which causes the tool to move in the needed direction. Suitable adjustments could be made for the condition where the pointer plane is not vertical.

Figure 5:
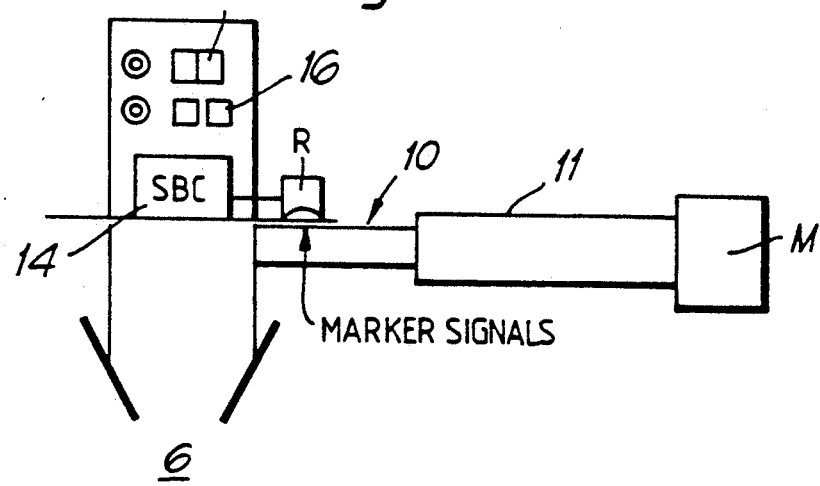
FIG. 5 is a side elevation of a tool.

As well as being sensitive to the marker signals provided by the operator each tool is arranged to communicate optical signals with the neighbouring tools in the sub-array. In other applications communication can be arranged to take place between a given tool and any given subset of remaining tools. The pattern need not be fixed as in the presently described embodiment. The tool then determines from predetermined attributes of the received signals, e.g. its intensity, its relative spacing from the neighbouring tools and, where necessary, subsequently moves to adjust the spacing in accordance with predetermined spacing thresholds and tolerances. To this end each tool includes a light source 15 arranged to transmit light two colours, in the present example red and green, together with photodetectors 16 arranged to receive corresponding: signals from the other tools (FIG. 5). The tool also includes input devices, which in the present example are simple rotary controls, which allow the predetermined thresholds for spacing and spacing tolerance to be set; as described in further detail below.

The main problem dealt with is that of causing the array of planting tools to space themselves appropriately from each other. The spacing motor-response is driven by machine perceived perceptual cues. In a semi-automatic system spacing from objects other than tools is guided by the operator via a pointer.

In the case being dealt with each tool in the array is; to be identical to any other tool in the array. The members of any pair of tools perform identical functions and respond identically to given sensory input. Tools are interchangeable. A single inter-tool spacing prescription applies to any pair of immediately adjacent tools (as defined). In no case does the work area of one planting tool overlap that of another planting tool. If semi-automatic or automatic site preparation were to be performed then tools would operate in overlapping region of work.

Each tool is able to be set for the range of intertree spacings and tolerances which give the required planting density. This is done with a small number of hand altered "dial" adjustments, one for inter-tree spacing and one for tolerance (FIG. 15). To set the inter-tree spacing or the tolerance the operator has only to turn the dials to the chosen settings.

The tool spacing response is based upon a sensitivity to a light intensity threshold, a response closely similar to that used in semi-automatic choice to halt a tool at the threshold (TH).

What the dial adjustments will do is to alter the position of a light intensity threshold value. A spacing distance can be set by dimming or by brightening a light. The tolerance value allows a tool to move a given distance towards an adjacent higher order tool (see below) from a given maximum inter-tree distance (D). The tolerance setting can be obtained by the use of a pair of spacing lights to which correspond on an adjacent tool a pair of light sensors. A first adjustment adjusts the brightness of both light sources for a given spacing distance (D-practical). A second adjustment adjusts a given one of the pair for the practical tolerance to be used. An adjustment of the receptor system could be used but here an adjustment of the light sources is used, the same effect as that used for semi-automatic choice is used.

Figure 16:
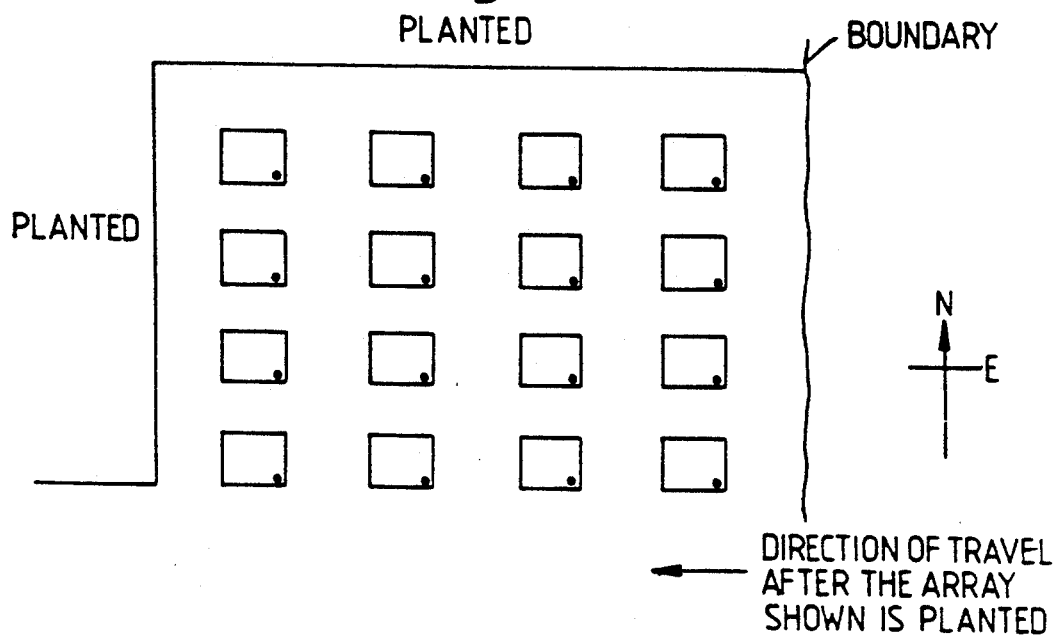
FIGS. 16 and 17 show a planting pattern and tolerance regions for the planting sites.

A tolerance prescription contains within it an implicit order of precedence. The position in which a hand planter is allowed to place a tree is defined relative to already planted trees. A perfect arrangement of tolerance regions is shown in FIG. 16. Here the order of precedence is from "west" to "east" and from "north" to "south". Let an arbitrary number of rows be already planted in this pattern. In order to obtain this pattern and its continuation in the next row (FIG. 16) an order of precedence must be imposed on the tool array. This direction of precedence is shown in FIG. 19 with the highest order tool marked with a "No. 1" in its tolerance region.

A choice has been made to use a tool starting position which is shown in FIG. 18. In this figure, the ideal start positions within a tolerance region relative to a given tool (indicated by a dot) in the four orders of precedence are shown. The arrows show the direction of the precedence order. In an automatic system, when an array of trees is being placed simultaneously, the order of precedence will "pull" a lower order tool towards the relevant higher order tools. It will scan towards the immediately adjacent higher order tools. The tools on the boundary with planted trees or on another type of boundary will not be under the influence of two higher order tools. The No. 1 tool will not be under the influence of any other tool. Nonetheless its motion must be constrained to a given tolerance region (relative to an ideal start position). The motion of the boundary tools will likewise have to be constrained. These problems are dealt with in the section on tool set-up.

Each tool in an automatic system scans its tolerance region until it finds a good planting spot at which point it halts and enters a "Plant" sub-routine. Once it has entered "Plant" it cannot be moved by spacing signals.

To prevent possible over-spacing of adjacent higher order tools the order of precedence of a stationary tool becomes locally high. This gives rise to a "chain" effect.

In a semi-automatic system the operator will set the order of precedence (see the section on tool set-up). This will bring each tool to a start position and will at the same time define a tolerance region relative to the start position of each tool. If the operator chooses for any tool a planting position which is outside this region then the spacing response will prevent the tool from moving to it. This response (the tool does not move to the spot pointed to and plant) will warn the operator of a wrong choice.

The members of an array of tools can be made to space themselves correctly from already planted trees and from each other if,
1. An order of precedence is imposed upon the tools.
2. Any given tool responds to a D-signal (inter-tool distance) from immediately adjacent higher order tools.
3. Any given tool produces a D-signal which is received. by immediately adjacent lower order tools.
4. Any given tool responds to a T-signal (tolerance) from immediately adjacent higher order tools.
5. Any given tool produces a T-signal which is received by immediately adjacent lower order tools.

Inter-tool and operator/tool communication is to be via light or sound carried signals. An example of operator/tool communication by means of light carried signals has already been described above.

The order of precedence. Higher order tools transmit light to lower order tools. A given tool spaces from tools from which it is receiving light. The order of precedence can be altered by arranging for a different pattern of inter-tool transmission and receipt of light. How a given pattern of transmission and reception is arranged is discussed in the section on tool set-up.

The adjustments for D (inter-tool distance) and T (tolerance) are made to the transmitter of light. The means used is identical to that used to set the threshold TH is semi-automatic choice. The "D"-light and the "T" light are adjusted together by being dimmed or brightened. The effect of this is to bring a chosen threshold value farther from or nearer to the light sources. The T-value is then set from the D-value by a further dimming of the T-light.

The T-value allows a tool to move towards the T-light source of an immediately adjacent higher order tool to a minimum inter-tool distance. The D-value allows a tool to move away from an immediately adjacent higher order tool to a maximum distance. In the circumstances where the movement of a higher order tool brings the inter-tool distance either tool low or too high a response to a discrepancy with either the T-threshold or with the D-threshold (via the SBC) will cause the lower order tool to move to a position where it receives input which is between the T and D threshold values.

The input from a given D-sensor with a given setting no matter what its position in an array and no matter on which of the four sides of the spacing sensor it is placed always gives rise to the same motor response.

Similarly the input from a given T-sensor always gives rise to the same motor response.

Any two pairs of T and D sensors are therefore interchangeable. Any two T sensors are therefore interchangeable and a given tool may be placed anywhere in the tool array.

It is necessary to arrange that an array of tools plants in a consistently spaced pattern. This can be done if a consistent pattern of tolerance regions can be obtained; each tool plants a tree in an associated region.

The following sequence is followed.

1. With the vehicle on reasonably level ground and blocked, the main beams are set for a given inter-tree spacing by hand operated controls and end-stops. The required end stop positions on the longitudinal axis for a given spacing are marked on the vehicle frame.

2. All corner tool sub-beams are end stopped. To move a sub-beam to a position within the end stops, so as to allow their being set a pointer is used.

3. Setting the order of precedence. The order of precedence is set in the field. Before the planting direction and the position of the vehicle relative to a boundary is known the order of precedence needed will not be known.

The operator will set the order of precedence using the trailing tool which is closest either to a boundary or which is bounded on two sides by planted trees.

Figure 17:
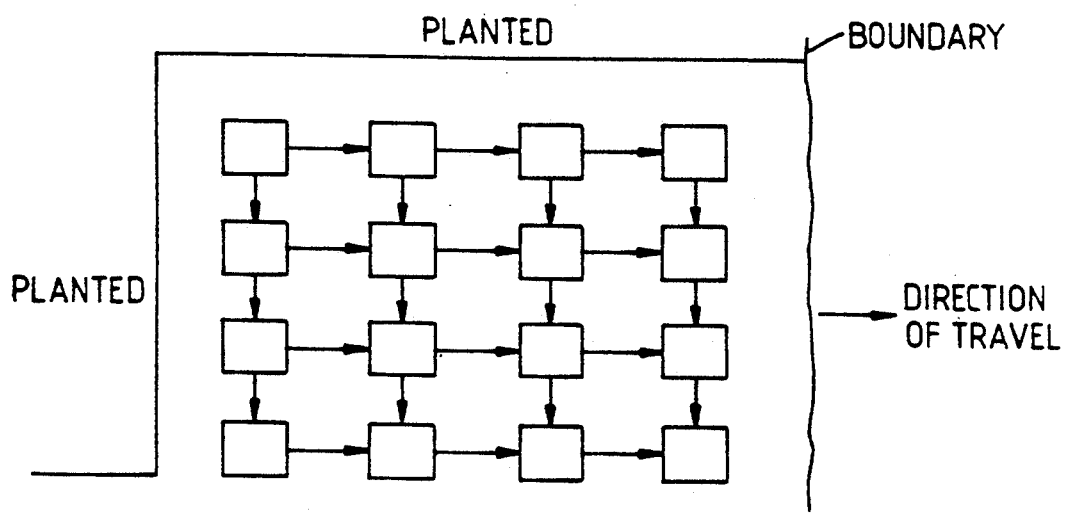

The start position needed for each order of precedence is shown in FIG. 18. The processes of setting the order of precedence and obtaining the start position are combined. The same sequence of operator action with a pointer is needed for all orders of precedence. The first order of precedence is assumed to be needed in what follows. The sixteen tool array of FIGS. 16 and 17 is to be dealt with. Before the No. 1 tool is brought to the start position the other tools which are immediately adjacent will be assumed to be in any position allowed by the actuator motion; they will probably by fully retracted at the start of work. The order of precedence needed is signalled by the pattern of illumination of the tools in an array. The pattern which it has been assumed to be needed is shown in FIGS. 16 and 18. Higher order tools illuminate the spacing sensors of lower order tools. This pattern is obtained throughout the array from the actions of the No. 1 tool.

Method 1

A semi automatic method of tool set-up is provided which is triggered by simple operator initiated pointer signals.

Figure 20:
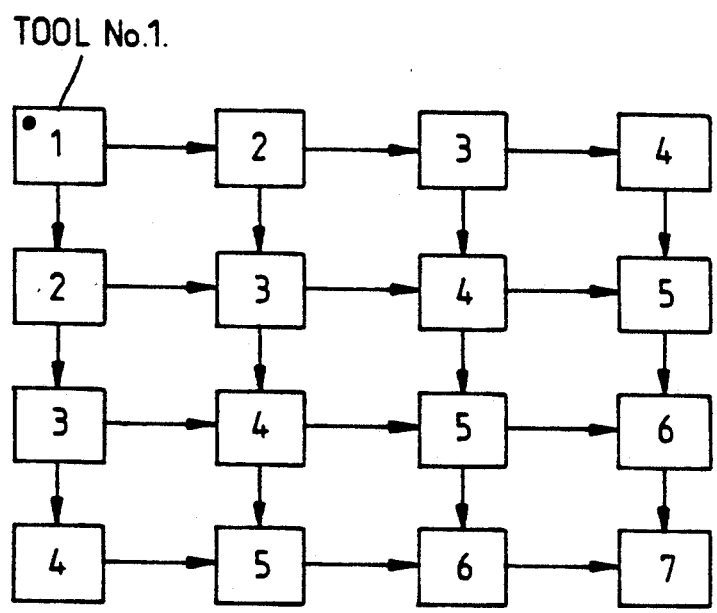
FIG. 20 is a diagram showing orders of precedence in the array.

In outline this method requires that the No. 1 tool which has been chosen be moved by pointer to a position shown in FIG. 20. In this figure the numbers 1 to 7 denote procedure orders and the arrows show the final pattern of illumination. The first effect used is that reception by a tool in a "start" state of either a pointer signal or spacing signals causes it to move to a state of balance and towards TH. If a pointer signal has been received then when both X and Y end stops are met the tool halts and all the spacing lights of the No. 1 tool come on. The second effect used is that if a tool is illuminated on a given side it turns on the spacing lights (D and T) on the opposite side once it has come to balance and D. Once the correct lights of the boundary tools have been turned on then all lower order tools (FIG. 20) will come to be illuminated on two sides. Their correct spacing lights on two sides can be turned on by the effect. An initial difficulty arises because the boundary tools are only lit on one side so that a second effect is needed to cause them to turn on correctly a second side. This is done by using the pattern of motion of the higher order tool which is illuminating the one side. For the second order tools (FIG. 20) this pattern is recognised as the No. 1 tool moves back from the position to which it was moved by pointer to the start position. The motion of the second order tools signals the same thing to the boundary third order tools and so on.

Once the second order tools light on both sides a "chain" effect runs through the array causing the remaining tools to light. Each higher order tool receives a signal from the immediately adjacent lower order tools which signifies that they are lit on both sides or lit on one side and require movement information. The signal to the higher order tool is the same in either case. It causes the tool to move back to the start position.

Motion back to start is a chain effect of the spacing and balance responses. The No. 1 tool is moved back to the start position by the pointer. It responds to the pointer only after having received signals to move from its adjacent tools. (An operator "override" will move the No. 1 tool if necessary, e.g. in the case of a wrong choice of No. 1 tool etc.). The second order tools being lit and having received "spacing lights on" signals from both adjacent lower order tools then follow the No. 1 tool to the start position. The response of the third order and lower tools is identical to the second order response. A difficulty arises with the lowest order tool which has no lower order tools to signal that it must move to start. This problem can be overcome in more than one way. One solution is to have every tool signal when it reaches start by, for example, turning its spacing lights OFF/ON or by a sound signal. This signal will have no effect on the higher order tools which have received move signals. In the lowest order tool a move to start the appropriate sub-routine will be called.

The overall effect is to bring all tools to the start position correctly lit.

The operator actions needed to achieve this are those of directing the No. 1 tool to the position shown in FIG. 20 and when the No. 1 reaches this position moving the pointer so as to cause the No. 1 tool to move to the start position. No more operator actions are needed to set the array order of precedence and the correct start position for that order.

The problem of turning on correctly the lights of the tools in an array has been described for the case of the first order of precedence and for a tool on either side of the No. 1 tool. The events and their order needed in the other orders of precedence are identical to the case described.

With a pattern of transmission and reception established tools will space from higher order tools and, in an automatic system, move in tolerance regions which are arranged correctly. Even so, a difficulty arises in automatic systems when a given tool has halted and entered a "Plant" sub-routine. In this condition it will no longer respond to spacing signals. Its contact is lost with higher order adjacent tools. The possibility arise of these tools over-spacing from the halted tool. To avoid this, as soon as the "Plant" sub-routine is entered the halted tool turns on all its spacing lights; it will now not respond to spacing signals; it has acquired a local highest order. Receipt of light input from the halted tool will now suppress the spacing lights (D and T) on the side of reception.

In the preferred embodiments discussed above, the perceptual cues used take the form of light transmitted between the tools or transmitted by the user to mark regions of the ground from which the light is diffusedly reflected and detected by downwardly pointing light sensors on the tools. As an alternative to the use of light, or in addition to the use of light, high frequency sound signals may be used. For example, instead of relying solely upon the detection of a bright spot the pointer and each of the tools may be equipped with a sonar range finder as commonly used, for example, in automatic focusing systems for cameras. If the pointer and the tools are arranged to exchange signals, there is a variety of ways of arranging for the SBC to calculate the position of the TH and of a planting spot displaced from the TH.

When using sonar, the tool may be sensitive to the intensity of the received sonar signal so that a desired position on the ground can be marked by a sonar "bright spot" analogous to that described above with respect to the light detectors.

TABLE 1

| Condition | Sensor | | Motor Action |
| --- | --- | --- | --- |
|  | Red | Green |  |
| | 1 | 0 | Move to low (green) |
| | 0 | 1 | Move to low (red) |
| | 1 | 1 | Halt |
| | 0 | 0 | No Action |

[1 = lit, 0 = unlit]

I claim:

1. An array of tools for planting, comprising a plurality of tools aligned in an array, each tool being provided with:
   (a) an independent sensory motor system comprising means to move the tool independently with respect to the array;
   (b) a detector for detecting a perceptual cue in the environment of the tool;
   (c) control means for the means to move, the control means being responsive to a control signal to position the tools automatically in a desired location, the control means including means to generate a predetermined motor response in the means to move in response to the perceptual cut, the perceptual cue being generated by a signal source controlled by the user, the signal source comprising a light source arranged to generate different regions of illumination, and the detector including photosensors responsive to different regions of illumination, the tool being arranged to move to a location on the boundary between the regions of illumination, the different regions being illuminated by light of different colors and the photo-sensors including sensors response to the different colors.

2. A method according to claim 1, in which the predetermined motor response is such that the tool moves towards the boundary between the two regions until it is on the boundary, and subsequently moves along the boundary until it reaches a location associated with the given perceptual cue.

3. An array according to claim 1, in which the perceptual cue detected by the detector for one tool is a signal generated by a neighboring tool, and the control means are responsive to the signal to determine a parameter dependent on the relative spacing of the tool and the said neighbouring tool.

4. An array according to claim 3, in which the means responsive to the signal comprise a sensor arranged to receive the signal, comparator means arranged to determine from the received signal the parameter dependent on the spacing and to compare the said parameter with a predetermined threshold, and the control means are responsive to the comparator means to adjust the spacing of the tool and the neighbouring tool in accordance with the results of the comparison.

5. An array according to claim 4, further comprising means for setting a parameter or parameters determining the precedence of each tool, the tools being arranged so that when a tool and a neighbouring tool are found to have spacing falling outside predetermined limits the tool having the lower precedence moves to increase the relative spacing.

6. An array according to claim 5, in which each tool includes means to transmit a first signal determining the inter-tool spacing and a second signal determining the tolerance in the inter-tool spacing.

7. An array according to claim 5 or 6, including means for automatically moving the tools in the array to a predetermined initial condition from which to start operation.

* * * * *